May 17, 1960     R. B. JOHNSON     2,936,494

METHOD OF MOLDING FLASH-FREE PLASTIC ARTICLES

Filed Nov. 12, 1957

INVENTOR.
Richard Bruce Johnson

BY

ATTORNEYS

United States Patent Office 2,936,494
Patented May 17, 1960

2,936,494

METHOD OF MOLDING FLASH-FREE PLASTIC ARTICLES

Richard Bruce Johnson, Massapequa, N.Y., assignor to Ideal Toy Corporation, Hollis, N.Y., a corporation of New York Application November 12, 1957, Serial No. 695,909

3 Claims. (Cl. 18—59)

This invention relates to a method for making a molded form free of excess material, such as fins, burrs, flashes and the like, in a mold having separable parts or sections. The invention is particularly applicable, but not limited, to a method for making parts of dolls, such as limbs, trunk or head, which are adapted to be connected by a swivel coupling.

In the method of the present invention, a toroidal piece formed of a resilient material is placed in the mold and interposed between the separable mold parts to produce an effective seal therebetween. The material of which the molded form is to be made is heated within the mold in contact with the toroidal piece, so that when the material solidifies in the mold, the toroidal piece becomes fused with the molded form. The toroidal piece, therefore, becomes an integral part of the molded form but, more important, it effectively serves during the molding operation to prevent the material in fluent state from seeping between the mold parts or sections, which tendency is normally responsible for producing the excess material on the molded form which must subsequently be trimmed therefrom.

The present invention is particularly adapted to the manufacture of dolls and doll parts made of a resilient thermoplastic material, in which the limbs and head are pivotally coupled to the trunk, such that the doll's limbs and head may be manipulated to simulate different lifelike positions. Dolls of this type have been made by forming one of the two pivotally coupled parts with a circular, outwardly projecting flange which is capable of being inserted within a somewhat smaller circular opening in the other part. The pivotal doll part is also provided with a circular section offset from the flange. When the flange is inserted properly within the opening, the surface or edge defining the opening will surround and thereby serve as a bearing for the said circular section of the pivotal part contained therein.

Heretofore it has been customary to mold the pivotal part, including the swivel coupling, in a mold consisting of upper and lower sections, at least one of which sections is movable relatively to the other. The leg proper is formed in one of these mold sections, and the outwardly extending flange is formed in the other of the mold sections. The mold cavities of both mold sections, however, are in communication, so that the flange is formed integrally with the leg.

A very serious objection to this process, however, is the tendency of the material in fluent state introduced into the mold to seep between the upper and lower mold sections, thereby producing a fin or flash around the outer periphery of the flange which must later be trimmed from the flange in a separate operation. The present invention not only makes possible the elimination of the trimming operation but, in addition, makes it possible to make the flange portion of the part from scrap or waste material, thereby affording savings in time, material and manpower.

For a complete understanding of the present invention, reference may be made to the detailed description which follows and to the accompanying drawing, in which.

Figure 3:
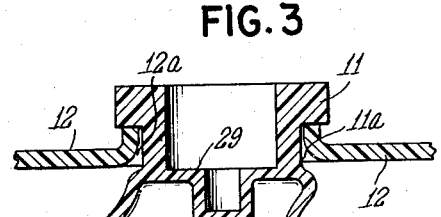
Figure 3 is a fragmentary cross-sectional view of a doll showing part of a pivotal limb made in accordance with the present invention.

The invention is described herein as applicable to the manufacture of a hollow doll's limb, generally designated by the reference numeral 10 in Figure 3. It is understood, however, that the method herein disclosed is equally applicable to the manufacture of other plastic forms, including the head and trunk of a doll.

The doll's leg is preferably made of a resilient thermoplastic material, such as polyvinyl chloride. The upper end of the doll's leg (as shown in Figure 3) is provided with an outwardly projecting flange 11 which is insertable within an opening 12a in the trunk 12 of the doll, and the leg is anchored to the trunk by virtue of the fact that the outer diameter of the flange 11 is substantially greater than the diameter of the opening 12a. The flange 11 is formed integrally with the upper end of the leg, and it is connected thereto by an annular portion 11a of smaller outer diameter than the flange 11. The edge defining the opening 12a in the trunk surrounds the outer periphery of the portion 11a, and thereby serves as a bearing which permits the limb to be pivoted relative to the trunk.

Figure 2:
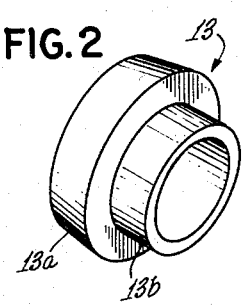
Figure 2 is a perspective view of the pre-formed toroidal piece which seals the mold during the molding operation.

In the manufacture of the limb 10, a toroidal member 13 (see Figure 2) is pre-formed, such as by molding, from a resilient material, preferably scrap or waste of the same material as that of which the limb proper is made. The member 13 includes a portion 13a of larger outer diameter and a portion 13b of smaller outer diameter. The outer periphery of the portion 13a is slightly tapered upwardly or in a direction away from the portion 13b.

Figure 1:
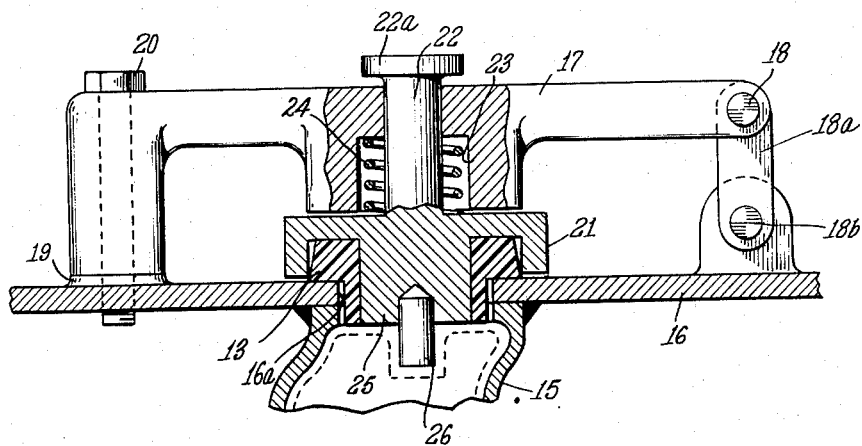
Figure 1 is a fragmentary, elevational view in cross-section of a mold structure for molding a form in accordance with the present invention.

The member 13 is then inserted between upper and lower separable sections of a mold. The mold comprises a lower mold part or section 15 which is joined or welded to the bottom of a horizontal supporting plate 16, an upper mold part or section 21, and a support structure 17 therefor which is pivotally connected at 18 to a link 18a which, in turn, is pivotally connected at 18b to the top of the supporting plate 16. When the upper mold section is in the operative position illustrated in Figure 1, the free end thereof abuts against the upper surface of a boss 19 formed on the supporting plate 16. The upper mold section can be tightly locked to the supporting plate 16 by one or more bolts 20.

The upper mold section 21 is connected to the lower end of a plunger 22 which is guided for axial movement relative to the upper support structure 17. The underside of the upper support structure is formed with an annular boss 23 which accommodates a compression spring 24 therein. The compression spring 24 normally urges the mold closure member 21 downwardly toward the upper surface of the horizontal plate 16, and in this position the mold closure member 21 forms the upper end and cover of the mold cavity formed in the lower mold section 15.

The underside of the mold closure member 21 is dished out or recessed, and a cylindrical core 25 is affixed thereto at the center. A pin 26 depends from the center of the core 25.

Prior to the molding operation and before the upper mold section is closed, the cavity of the mold section 15 is partially filled with molding material in relatively fluent state, and the preformed toroidal member 13 is placed on the core 25. The pivotal structure 17 is then pivoted to closed position and the bolts 20 applied to secure it in closed position. When the pivotal structure is locked in place, the portion of the collar 13b is positioned within the circular opening 16a which forms the upper end of the mold cavity. There is, however, ample clearance between the surface defining the opening 16a and the outer periphery of the portion 13b of the collar to permit the fluent material to come into contact and fuse with this part of the member 13.

During the molding operation, which preferably is by rotational or slush molding methods, the pressure exerted by the spring 24 forces the closure member 21 toward the upper surface of the plate 16 against the resistance offered by the resilient toroidal member 13. The resistance offered by the member 13 is due to the fact that the thickness in an axial direction of the portion 13a is greater than the depth of the portion of the mold cavity formed in the closure member 21. A heated fluid is brought into heat exchange relationship with the mold section 15, and the entire mold is rotated about multiple axes for a predetermined period of time sufficient to soften the toroidal member 13 which causes it to conform to the shape of the mold cavity in the closure member 21. During the rotational movement of the mold, the material is brought into contact with the surface defining the mold cavity, causing the material to adhere thereto. Since the quantity of the material initially introduced into the mold is considerably less than the full capacity of the mold, a hollow, rather than a solid, molded form is produced. The mold is then brought to rest and permitted to cool, thereby fusing the toroidal member 13 with the molded leg. During the cooling operation, the slight taper formed in the outer periphery of the portion 13a is lost due to the re-shaping of the toroidal member by the mold cavity in the closure member 21.

After cooling, the bolt or bolts 20 are removed, thereby unlocking the upper mold section. The upper mold section is then lifted upwardly and the molded leg is forcibly withdrawn from the molded form. The form thus molded includes a wall 29 which facilitates the handling thereof. Since it serves no useful purpose in the final doll assembly, it may be removed, if desired.

The invention has been shown in preferred form and by way of example only, and obviously many variations and modifications may be made therein without departing from the spirit of the invention. The invention, therefore, is not to be limited to any specified form or embodiment, except in so far as such limitations are set forth in the claims.

I claim:

1. A process for making a molded form in a mold which is closed by the application of a cover thereto, the molded form being free of excess material resulting from the penetration of the material in the mold between opposing contacting surfaces of the mold and mold cover, comprising the steps of pre-forming a ring-like seal of resilient fusible material, introducing the material to be molded into the mold, applying the cover to the mold, interposing the ring-like seal between spaced-apart surfaces of the mold and cover which are adjacent but inside of the contacting surfaces of the mold and the cover, the thickness of the resilient ring-like seal being greater than the spacing separating the surfaces of the mold and mold cover adjacent and inside the opposing contacting surfaces when the contacting surfaces of the mold and mold cover are in engagement, whereby the thickness of the ring-like seal offers resistance to the application of the cover to the mold and the seal isolates the material within the mold from the contacting surfaces of the mold and mold cover, and bringing the material within the mold into contact with the pre-formed ring-like seal while the material is heated to its fluent state, so that the seal will become an integral part of the molded form.

2. A process for making a molded form in a mold which is closed by the application of a cover thereto, the molded form being free of excess material resulting from the penetration of the material in the mold between opposing contacting surfaces of the mold and mold cover, comprising the steps of pre-forming a ring-like seal of resilient fusible material, placing the ring-like seal on an internal core of the mold cover such that one side of the seal engages the inner surface of the mold cover intermediate the core and the surrounding surface of the mold cover which contacts the surface of the mold when the mold cover is closed, introducing the material to be molded into the mold, applying the cover to the mold, thereby positioning the ring-like seal between spaced-apart surfaces of the mold and mold cover which are adjacent but inside of the contacting surfaces of the mold and mold cover, the thickness of the resilient ring-like seal being greater than the spacing separating the surfaces of the mold and mold cover which opposite sides of the ring-like seal engage when the contacting surfaces of the mold and mold cover are in engagement, whereby the thickness of the ring-like seal offers resistance to the tight application of the cover to the mold, causing compression of the ring-like seal, the seal isolating the material within the mold from the contacting surfaces of the mold and mold cover, and bringing the material within the mold into contact with the pre-formed ring-like seal while the material is heated to its fluent state, so that the seal will become an integral part of the molded form.

3. A process as set forth in claim 2 in which the seal is formed initially with a flange portion which is imposed between the spaced-apart surfaces of the mold and mold cover adjacent and inside of the contacting surfaces of the mold and mold cover and a neck portion which extends in the direction of the core into the mold.

References Cited in the file of this patent

UNITED STATES PATENTS

| | | |
|---|---|---|
| 1,309,757 | Kempton | July 15, 1919 |
| 1,702,958 | Bard | Feb. 19, 1929 |
| 1,955,720 | Rollman | Apr. 17, 1934 |
| 2,221,695 | Robertson | Nov. 12, 1940 |
| 2,347,737 | Fuller | May 2, 1944 |
| 2,477,899 | Rempel | Aug. 2, 1949 |
| 2,696,642 | Kohrn | Dec. 14, 1954 |
| 2,713,369 | Strahm | July 19, 1955 |